US008706702B2

(12) United States Patent
Marquez et al.

(10) Patent No.: US 8,706,702 B2
(45) Date of Patent: Apr. 22, 2014

(54) METHOD FOR DATA MANAGEMENT IN A COLLABORATIVE SERVICE-ORIENTED WORKSHOP

(75) Inventors: Bernard Marquez, Le Castera (FR);
Thierry Chevalier, Pibrac (FR);
Philippe Sauvage, Lacroix-Falgarde (FR)

(73) Assignee: Airbus Operations S.A.S., Toulouse (FR)

( * ) Notice: Subject to any disclaimer, the term of this patent is extended or adjusted under 35 U.S.C. 154(b) by 416 days.

(21) Appl. No.: 12/991,527

(22) PCT Filed: May 14, 2009

(86) PCT No.: PCT/FR2009/000566
§ 371 (c)(1),
(2), (4) Date: Nov. 8, 2010

(87) PCT Pub. No.: WO2009/147310
PCT Pub. Date: Dec. 10, 2009

(65) Prior Publication Data
US 2011/0060729 A1    Mar. 10, 2011

(30) Foreign Application Priority Data
May 14, 2008  (FR) ..................... 08 53121

(51) Int. Cl.
*G06F 7/00*    (2006.01)
*G06F 17/00*   (2006.01)
*G06F 9/45*    (2006.01)
*G06F 9/46*    (2006.01)
*G06F 15/16*   (2006.01)

(52) U.S. Cl.
USPC ........................... 707/690; 718/108; 717/149

(58) Field of Classification Search
USPC ........................... 718/108; 707/690; 717/149
See application file for complete search history.

(56) References Cited

U.S. PATENT DOCUMENTS 7,529,762 B2 *  5/2009  Casati et al. ................. 705/7.27
7,536,690 B2 *  5/2009  Alverson et al. .............. 718/108
(Continued)

FOREIGN PATENT DOCUMENTS

JP        10-091449        4/1998

OTHER PUBLICATIONS

Li, N., et al., "Research and Realization of Collaborative M&S Services in Simulation Grid," Cluster Computing and the Grid, CCGRIDW'06, IEEE, vol. 2, total 7 pages, (May 16, 2006).

(Continued)

*Primary Examiner* — Greta Robinson
*Assistant Examiner* — Brian E. Weinrich
(74) *Attorney, Agent, or Firm* — Oblon, Spivak, McClelland, Maier & Neustadt, L.L.P.

(57) ABSTRACT

A method for managing data in a collaborative service-oriented workshop, which is adapted to treat objects associated with data representative of real or process data, is provided to share data and resources in an architecture of a workspace. The architecture is adapted to design complex objects and manipulate information technology objects that represent data, which may be representative of a real object or a process based on metadata representing characteristic data. The metadata includes a generic part that is common to all data, a specific part that is inherent to the type of data, and links to other objects. The links make it possible to establish, at a later time, the traceability of the data, or in other words the traceability between the different data produced or used during execution of processes.

12 Claims, 9 Drawing Sheets

(56) References Cited

U.S. PATENT DOCUMENTS

| | | | |
|---|---|---|---|
| 2002/0059358 A1* | 5/2002 | Kanamori | 709/107 |
| 2004/0064818 A1* | 4/2004 | Alverson et al. | 718/107 |
| 2007/0174697 A1 | 7/2007 | Saridakis et al. | |
| 2008/0021926 A1 | 1/2008 | Brock et al. | |
| 2008/0161940 A1* | 7/2008 | Gerwens et al. | 700/4 |

OTHER PUBLICATIONS

Ardaiz-Villanueva, O., "On-demand Virtual Studios and Laboratories based on Grid Technologies for Project-based Cooperative Design and Engineering," The 9th International Conference and Computer Supported Cooperative Work in Design Proceedings, vol. 1, pp. 356-361, (May 24, 2005).

Aktas, M.S., et al., "XML Metadata Services," SKG'06, IEEE, total 6 pages, (Nov. 1, 2006).

Tretola, G., et al., "Extending Web Services Semantics to Support Asynchronous Invocations and Continuation," ICWS 2007, IEEE, total 8 pages, (Jul. 1, 2007).

International Search Report issued Oct. 20, 2009 in PCT/FR09/000566 filed May 14, 2009.

Office Action issued Jul. 9, 2013, in Japanese Patent Application No. 2011-508973 (with English-language Translation).

* cited by examiner

METHOD FOR DATA MANAGEMENT IN A COLLABORATIVE SERVICE-ORIENTED WORKSHOP

TECHNICAL FIELD

The present invention concerns information technology architectures for collaborative work and more particularly a method for data management for a collaborative service-oriented workshop.

BACKGROUND

Optimization of the study and design phases for objects such as vehicles for the purpose of reducing the development costs and time generally necessitates the employment of a specific information technology environment.

For example, the aerodynamic study of an aircraft involves numerous specialists working on different aspects of the same data, which aspects may or may not be related to one another. These specialists generally use different information technology tools as well as different machines for execution of the processes being employed. In addition, these specialists may be situated at different geographic locations.

It is therefore proving advantageous to employ an environment based on an open architecture that permits sharing of data and information technology resources, especially calculating resources. Preferably, such an environment should be adapted to a range of heterogeneous machines and operating systems.

It is also advantageous to use an interface that it makes it possible to access separate and different existing tools. Such a common interface should be adapted in particular to manage data that have to be exchanged between these tools as well as to permit easy selection of and access to the data.

In addition, the environment preferably should permit easy adaptation to future needs, such as integration of new tools, management of new types of data and production of new types of results.

Furthermore, there exists a need for data traceability in order to determine the origin of the produced data as well as their life cycle during the different modifications and uses in calculation or other processes.

To some extent, these problems are solved independently of one another.

For example, there exist software applications such as SynfiniWay, developed by the Fujitsu Corporation (SynfiniWay and Fujitsu are trademarks), that permit optimization of the execution of tasks in a heterogeneous environment. The SynfiniWay application makes it possible in particular to virtualize the global resources and to present the applications in the form of services linked by data sequences and dependences in order to automate the information technology processes.

Furthermore, there exist script languages such as Python and Java (Python and Java are trademarks) that make it possible to automate certain tasks and to call up existing tools. Python is a high-level, interpreted and object-oriented programming language. It may be used in numerous contexts and be adapted to numerous uses by means of specialized libraries.

For its part, data traceability is generally determined by the processes that led to the data. For example, in the applications of PDM type (initials for Product Data Management in English terminology), the user must follow predetermined processes without being able to deviate from them. The origin of a datum is therefore determined by the process that made it possible to obtain the datum.

However, a centralized and optimized environment does not exist for the study and design of systems in a heterogeneous open collaborative environment.

The invention makes it possible to solve at least one of the problems mentioned in the foregoing.

The object of the invention is therefore a method for data management in a collaborative service-oriented workshop, adapted to treat objects associated with data representative of real or process data, this method comprising the following steps:

accessing at least one datum representative of real or process data, stored in memory in a remote device;

extracting at least one information item characteristic of the said at least one datum according to a predetermined parameter; and storing in memory the said at least one characteristic information item and a link to the said at least one datum in an object associated with the said at least one datum, the said object being stored in memory in a centralized storage zone.

The method according to the invention therefore makes it possible to manage data independently of their inherent characteristics, such as their nature, their storage location and their size, to permit global management thereof.

Advantageously, the method additionally comprises a step of receiving at least one complementary information item, the said complementary information item being stored in memory in the said object associated with the said at least one datum, to characterize the said at least one datum.

According to a particular embodiment, the said at least one characteristic information item comprises at least one attribute common to a plurality of data.

According to yet another particular embodiment, the said at least one characteristic information item comprises at least one attribute specific to the said at least one datum.

Preferably, the said object additionally comprises a link to a second object, separate from the said object known as first object, making it possible to link the objects with one another and in this way to offer the means for following a gradual relationship among a plurality of objects.

Advantageously, the method additionally comprises a step of determining the consistency of the said first object according to the said link to the said second object, making it possible to characterize an object according to predetermined rules.

According to a particular embodiment, the method additionally comprises the following steps:

selecting at least one object associated with data representative of a process;

determining, in the said object associated with data representative of the said process, a link to an object associated with data representative of real data employed by the said process;

executing the said process;

storing in memory, in the said object associated with data representative of the said real data employed by the said process, a link to the said object associated with data representative of the said process; and storing in memory, in the said object associated with data representative of the said process, a link to the said object associated with data representative of the said real data employed by the said process.

The method according to the invention is therefore capable of executing processes represented by objects and of establishing links between the objects associated with the executed processes and the objects associated with the real data employed by the processes, or in other words, for example, used or produced by the processes.

Advantageously, the method additionally comprises the following steps:

creating data representative of real data;

creating an object associated with the said created data;

storing in memory, in the said created object, a link to the said object associated with data representative of the said process; and storing in memory, in the said object associated with data representative of the said process, a link to the said created object.

The method according to the invention is therefore capable of executing processes represented by objects, of producing new real data, of creating objects associated with these new real data and of establishing links between the objects associated with the executed processes and the created objects associated with the new real data.

According to a particular embodiment, at least one of the said objects is stored in memory in the form of at least one table or at least one XML file.

Another object of the invention is a computer program comprising instructions adapted to the employment of each of the steps of the method described in the foregoing.

BRIEF DESCRIPTION OF THE DRAWINGS

Other advantages, objectives and characteristics of the present invention become clear from the detailed description hereinafter, provided by way of non-limitative example with reference to the attached drawings, wherein:

FIG. 2, comprising

DETAILED DESCRIPTION

Figure 1:
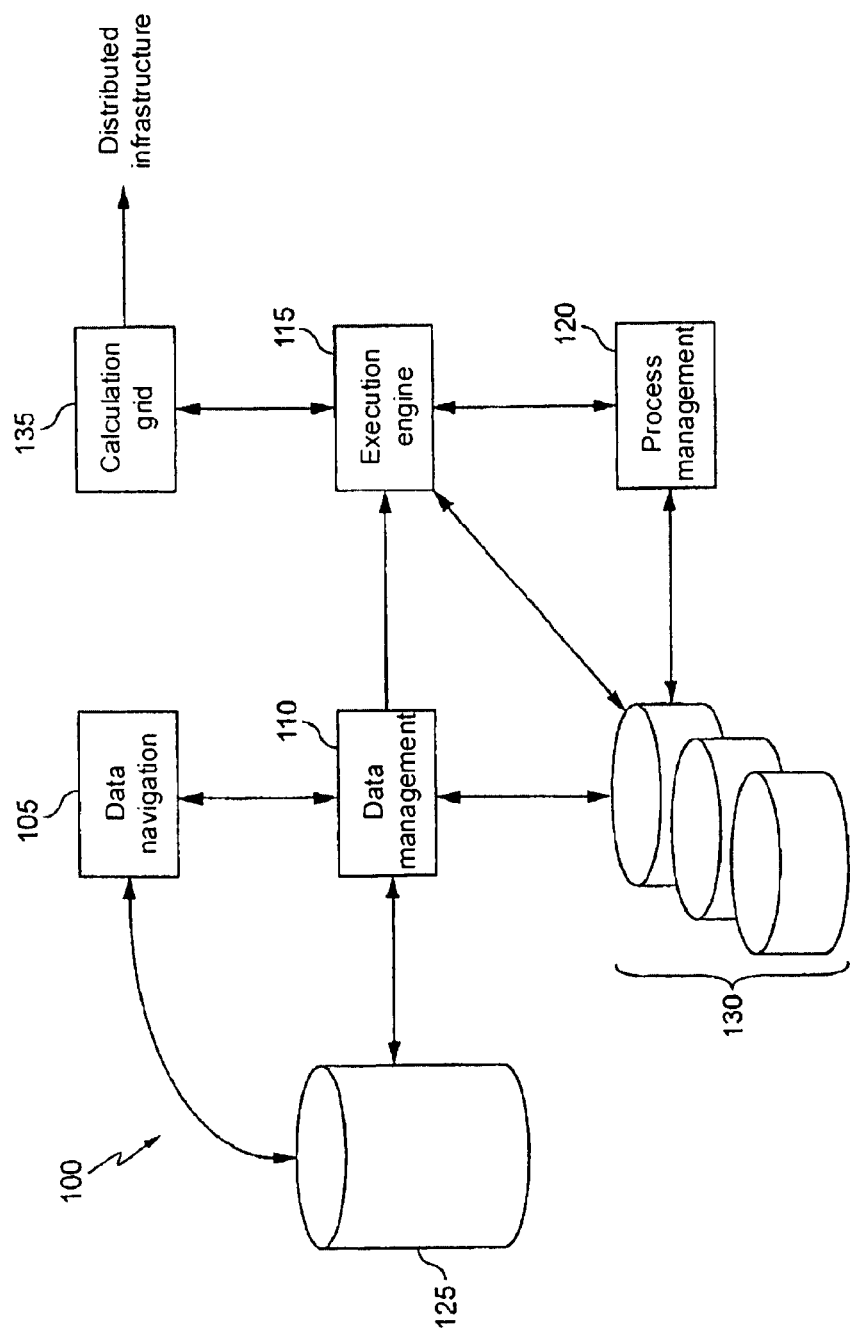
FIG. 1 schematically shows an example of architecture of a workspace for sharing of data and resources according to the invention.

FIG. 1 schematically shows an example of an architecture 100 of a workspace for sharing data and resources according to the invention, also known as collaborative service-oriented workshop. As illustrated, this architecture is constructed around four main modules: module 105, whose purpose is access to data, module 110, which is a data manager, module 115, which is an execution engine, and module 120, whose purpose is process management.

Data-access module 105 is connected to data-management module 110 as well as to a centralized database 125, such as a database of Oracle type (Oracle is a trademark). Data-management module 110 is connected to centralized database 125, to execution engine 115 and to an assembly 130 representing distributed storage zones which can be organized in different ways, such as in the form of files or databases. Execution engine 115 is itself connected to assembly 130 of storage zones and to process-management module 120.

Although this architecture is particularly adapted to the design of complex objects such as aircraft, the following description is based on a simple example for reasons of clarity and conciseness. This example is given for illustrative purposes.

Architecture 100 is adapted to manipulate information technology objects representing data in the broad sense of the term, since these data may be representative of a real object such as an aircraft or of a process such as an aerodynamic drag calculation process. In simplified manner, the collaborative service-oriented workshop works on data represented by information technology objects, themselves based on metadata representing characteristic data.

The data, known as framework data or FD in English terminology, are therefore physical data stored in memory, for example in the form of files in a storage zone 130. These data characterize a real object, such as the grid or the structure of a chair, or a process, such as the steps of a furniture-removal process. The size of these data is not limited, and may be several hundreds of megabytes. All the data used may be stored in memory in separate physical locations.

The objects, known as framework objects or FO in English terminology, represent objects having a particular significance in the application sense. As indicated in the foregoing, these objects are used to represent everything that can be manipulated by the collaborative service-oriented workshop. The objects are based on metadata sets that may be thought of as base elements or characteristic elements. One metadata set is therefore associated with each object. Each type of metadata set may be associated with a plurality of objects. The qualification of a type of metadata set makes it possible to form an object. If, for example, a type of metadata set is associated with a chair, one qualification of the chair forming an object may be a child's chair.

In the interests of clarity, the information technology implementations of objects, known as framework object proxies or FO proxies in English terminology, are assimilated here with the objects themselves.

The objects include the instantiated process models, known as instantiated process templates or IPT in English terminology. The instantiated process models are instances of process models, or in other words process models applied to one or more objects. The process models, known as process templates or PT in English terminology, are generic. For example, they relate to a process of constructing a room starting from several chairs and a table, a process of renovating a house or a furniture-removal process. The instantiated process models are represented in the form of objects and may be manipulated as such in the collaborative service-oriented workshop.

The metadata, known as framework metadata or FMD in English terminology, correspond to particular information items of the data. They make it possible to characterize the data in order to facilitate their manipulation. One datum may be associated with a plurality of metadata sets. The metadata are advantageously stored in memory in centralized database 125 in the form of tables or of XML files (initials for Extensible Markup Language in English terminology). One type is associated here with each metadata set. The metadata comprise generic information items such as an identifier, a creation date and a name of the creator, and specific information items, inherent to the associated datum, such as the material, the color or the weight of a chair. The metadata also comprise links to objects, thus making it possible in particular to determine how the data were obtained and/or how they have been used. These links make it possible to define data models, or in other words data tree structures.

The consistency of an object is verified via the links defined in the metadata set associated with it. For example, a data model of a table may be determined in such a way that a table is linked to a chair. If an object of table type is effectively associated with an object of chair type, then the object of table type is said to be consistent in the sense of the data model defined via its links.

The metadata are described, for example, by means of a language of XML type, according to the structure presented in the Annex under the heading "Code excerpt 1".

The generic part of the metadata is common to all data, and it is therefore defined during employment of the collaborative service-oriented workshop. Even if this part does not have any reason a priori to be modified, its definition may nevertheless evolve according to the needs. However, its evolution has an influence on all of the objects managed in the collaborative service-oriented workshop.

The specific part of the metadata is inherent to each type of data and consequently to each type of metadata set. This part is defined by the users of the collaborative service-oriented workshop. The information items of the specific part of the metadata are determined by the operations of automatic extraction that have to be performed on the data.

The generic and specific metadata are advantageously used to search for and sort data contained in the collaborative service-oriented workshop.

The example given in the Annex under the heading "Code excerpt 2" illustrates the description of XML type of a type of metadata used to describe a chair.

As described in the foregoing, the metadata advantageously comprise a generic part and a specific part. In the present case, the generic part comprises in particular the following elements:
  a key for managing control of access to the datum;
  a description of the type of object;
  a comment describing the datum;
  a creation date;
  an identifier of the datum, which may be a key or a URL via which the datum may be accessed;
  a unique identifier of the datum;
  an information item concerning the user who created the datum;
  the physical location of the datum, with its geographic situation; and
  its state, which makes it possible to know if a modification is in progress, and by whom.

The second part of the metadata, specific to the object being manipulated, in the present case a chair, comprises the following attributes in this example:
  the number of feet;
  the thickness;
  the color;
  the material; and
  the weight.

Naturally the generic and specific parts may comprise other types of information items.

The identifier or address of a metadata set makes it possible to retrieve the data with which it is associated.

The qualification of a metadata set representing a chair may be in particular "child" or "adult", making it possible to end up with two different objects.

In the same way, it is possible to define metadata and objects for tables. During importation of an object defining a table, it is possible to define, at the level of a data model, that this object is consistent only if it is linked to at least one object of chair type. Such a relation between objects is defined by the links defined in the metadata. These links may also be represented in XML format or in a table. During importation of an object of table type, links of data model type must be established between the object of table type and the objects of chair type in order to make this object consistent with the data model defined in this way.

Alternatively, the metadata may be represented in the form of tables. For example, a table may be associated with each type of datum. The columns of the table represent the metadata while each of its rows represents an object. Table 1 presented in the Annex illustrates a simplified example of representation of a type of metadata set that can be associated with data of chair type. It should be noted here that the links are not included in the table representing the metadata. According to this example, the links are stored in memory in a table of links.

A table of links may be represented, for example, in the form of the table presented in the Annex as Table 2, in which each column represents a pair of identifiers of objects between which a link is established.

Thus the information items stored in memory in the metadata tables and in the table of links make it possible to manipulate all of the present and future data of the collaborative service-oriented workshop as well as to construct data models.

It may be noted here that the representation of metadata in the form of tables is equivalent to an XML representation and that it is possible to use a conversion tool to switch from one representation to another.

Representation of data characterizing physical objects or processes is therefore achieved at several levels:
  the raw data;
  the metadata, which represent subsets of raw data, extracted therefrom, that make it possible to characterize the raw data;
  the objects, based on the values of the metadata, which are manipulated by the application modules; and
  the consistent objects, which are objects linked to other objects.

It should be noted here that, according to this structure, it is not necessary to employ synchronization methods in the collaborative service-oriented workshop.

Data-access module 105 makes it possible in particular for a user to access, in selective and centralized manner, metadata stored in memory in centralized database 125, especially in order to visualize these metadata, to construct views on these metadata, permitting effective sorting over all of the data accessible in the collaborative service-oriented workshop, as well as to follow, if necessary, the links uniting certain of these data.

Module 105 also makes it possible to record metadata in centralized database 125. Thus it is possible for a user to enter metadata via a man-machine interface (MMI) in order to specify information items that would not appear in the data stored in memory in storage zones 130. To access and record metadata, the user interface may use, in particular, requests of SQL type (initials for Structured Query Language in English terminology). This manual recording of metadata proves advantageous with regard to addition of specific information items that are not amenable to automatic extraction from the datum during importation of the object into the workshop.

Similarly, data-access module 105 makes it possible for a user to access, in selective and centralized manner, the data stored in memory in storage zones 130 via data-management module 110 as well as to record data. To access and record data, the user interface advantageously uses specific APIs (initials for Application Programming Interface in English terminology) and web services.

Data manager 110 is used as interface between data-access module 105, centralized database 125, storage zones 130 and execution engine 115, adapted in particular to apply processes to data. Data manager 110 also makes it possible to control the access rights of the users.

According to a particular embodiment, data manager 110 is composed of a client part and a server part. The client part may be implemented in a language of Python type to make it possible to access web services accessible in the server part. All the standard functions of data management, such as importation, exportation, publication, collaboration and management of rights are preferably available. This list is not exhaustive. All of the functions used in the course of the life cycle of the datum are available via this API.

The server part may be implemented, for example, in language of the Java or Python type to permit interfacing with the different databases and storage zones. Advantageously, this part is also in charge of the mechanisms for extracting metadata from data stored in memory in distributed storage zones 130 to centralized database 125 containing the metadata.

Execution engine 115 permits the execution of processes by way of process models based, for example, on discipline-specific applications. An interface between execution engine 115 and storage zones 130 permits access directly or via an API to the data during the execution of processes. Execution engine 115 is preferably linked to a calculation grid, for example of SynfiniWay type, which manages the submission of different processes on a distributed infrastructure as well as the movement of data during execution.

Preferably, execution engine 115 also comprises an interface with applications using flows of jobs (workflows in English terminology), such as the ModelCenter applications (ModelCenter is a trademark) or SynfiniWay, or in other words task execution or sequencing engines.

Process manager 120 permits the creation of high-level workflows known as composite processes, which encapsulate unitary treatments. These workflows may be subjected to parametric studies and to studies of sensitivities to parameters and may permit the creation of behavior models. These functionalities may therefore be used in connection with multi-disciplinary optimization studies.

Thus the treatment of non-unitary processes, or in other words processes relying on several different functions, is managed by the process manager in such a way, for example, that they are decomposed into unitary processes, which are then executed by the execution engine.

Figure 2B:
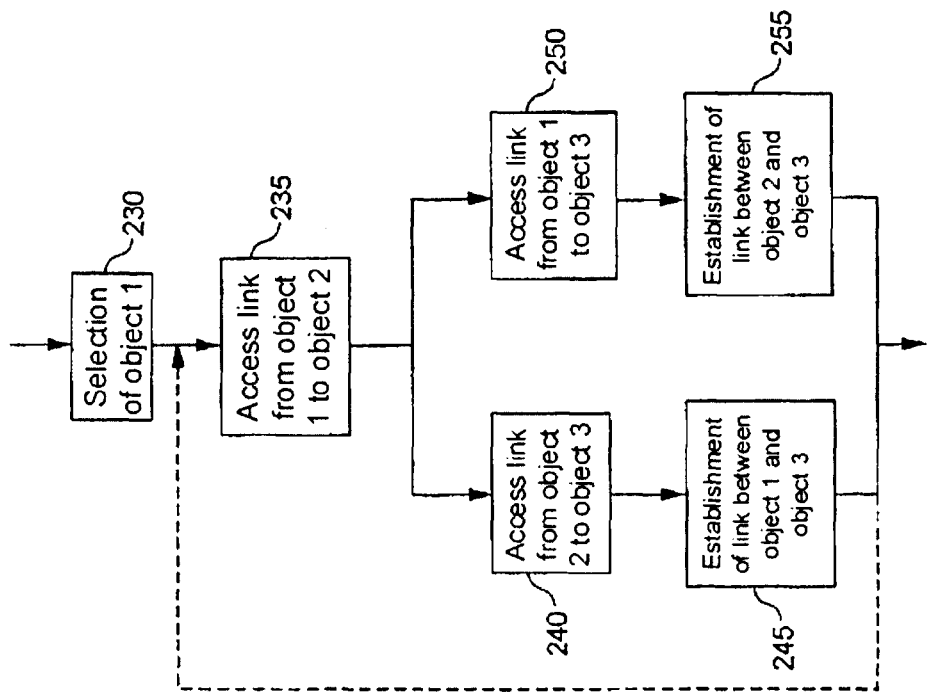
FIGS. 2a and 2b, illustrates a simplified functional diagram of the data manager presented in FIG. 1 and an example of an algorithm for establishing a data tree, respectively.
Figure 2A:
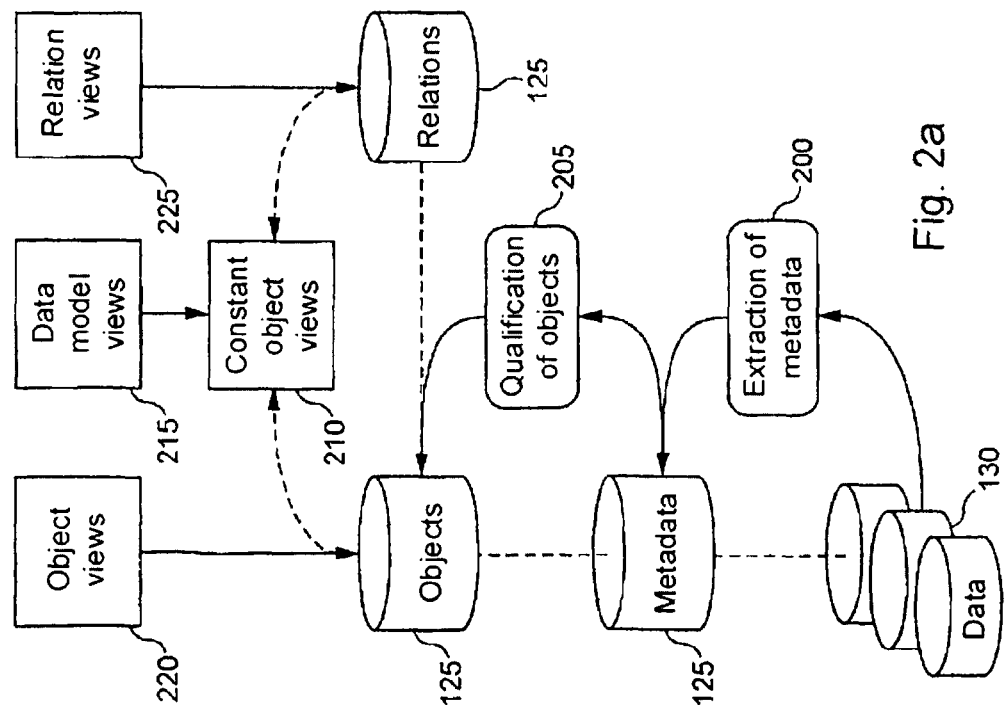

FIG. 2a is a simplified functional diagram of data manager 110.

Data are created in the different databases (not illustrated) by means, for example, of a file interface or of an interface of Corba type (acronym for Common Object Request Broker Architecture in English terminology; Corba is a trademark).

A mechanism 200 for extraction, transformation and loading, known as ETL (initials for Extract, Transform and Load in English terminology) is then employed in order to extract the metadata from data stored in memory in storage zones 130. They are stored in centralized database 125. This database therefore collects the information items of the physical data created in the different distributed storage zones 130.

It should be noted here that the extraction mechanism is employed when the data are created, modified or deleted. It is specific to each type of data and metadata.

A qualification function 205 makes it possible to qualify the extracted metadata to form objects that can be stored in memory in centralized database 125. Following qualification, verification of the consistency of the object is performed. This consistency may be assured via links, which may or may not be stored in memory together with the metadata, which links may be of different natures, such as the version, the configuration, the data model and the user.

A set of links between objects, defining a data model, may be used to determine links between several objects. The links are associated with metadata. As described in the foregoing, they are stored in memory with the latter or in separate manner, for example in a table of links stored in memory in centralized database 125.

The links make it possible to establish, at a later time, the traceability of the data, or in other words the traceability between the different data produced or used during execution of processes. Several types of links exist, especially the following:

the user links determined manually by the user between two data;

the model links, which make it possible to define a data model. These links are determined generically during creation of a data model;

the configuration links, which make it possible to establish a link between a set of objects in order to manage their configuration, or in other words to permit the application of identical functions, such as functions for exportation, importation and change of rights;

the version links, which make it possible to manage the same object according to different versions; and the production links, which make it possible to establish an execution link between a set of objects. This type of link is created automatically during the phase of publication of data during or at the end of execution of an instantiated process (IPT).

The set of these links placed in pairs makes it possible to obtain the traceability carried by the datum: the data contain all of the histories, especially as regards the execution of processes, the version, the configuration, the users and the models.

In this way it is possible to construct complete trees of objects linked to one another by metadata and specific links. In the example of the chair and the table, a tree making it possible to know the metadata (color and location) of the table verifies the data model linking it to chairs having a specific color as metadata. In this way it is possible to reconstruct, gradually, complete trees for obtaining data.

It should be noted here that the data models, or in other words the data tree structures, are specific to the data being manipulated in the collaborative service-oriented workshop. However, although the data models may be derived from links between the objects, they do not exist as such in the collaborative service-oriented workshop. They are implicitly created during the definition of objects, or in other words metadata sets corresponding to particular data types.

As illustrated in FIG. 2a, a function 210 of data manager 110 makes it possible to access links and objects in order to form a view of consistent objects, or in other words a view presenting the relations between objects, which view may be transmitted to a user in the form of data-model views 215.

Similarly, the user may visualize objects and relations in the form of object views 220 and of relation views 230, such as lists.

Thus, according to this embodiment, the user, or in other words the client part of data manager 110, has available the following three types of views:

a view via the metadata onto the objects contained in the different databases;

a view onto the data models created in architecture 100; and a view that makes it possible to navigate between the different objects via links defined in the metadata database or associated therewith, such as the version links, the user links, the configuration links and the production links that permit traceability.

A description of XML type of objects of object proxy type containing all of the metadata associated with each datum is advantageously created for use, for example, by execution engine 115, in order to access the data stored in memory in storage zones 130 in the course of execution of processes.

FIG. 2*b* illustrates an example of an algorithm that makes it possible to establish a data tree beginning with objects being manipulated in the collaborative service-oriented workshop, these objects indiscriminately representing real or process data.

After a first object has been selected (step 230), for example via a man-machine interface, a link to a second object contained in this first object is accessed (step 235). Then a link to a third object contained in this second object is accessed (step 240), in order to make it possible to establish a link between the first and the third object (step 245) or between the data associated with the first object and those associated with the third object.

Alternatively, a link to a third object contained in the first object is accessed (step 250), in order to make it possible to establish a link between the second and third object (step 255) or between the data associated with the second object and those associated with the third object.

As suggested by the dashed arrow, these steps may be repeated iteratively in order to determine a data tree, wherein the leaves represent the data (or the objects associated with the data) and the branches represent the links between the data (or between the objects associated with the data).

Figure 3:
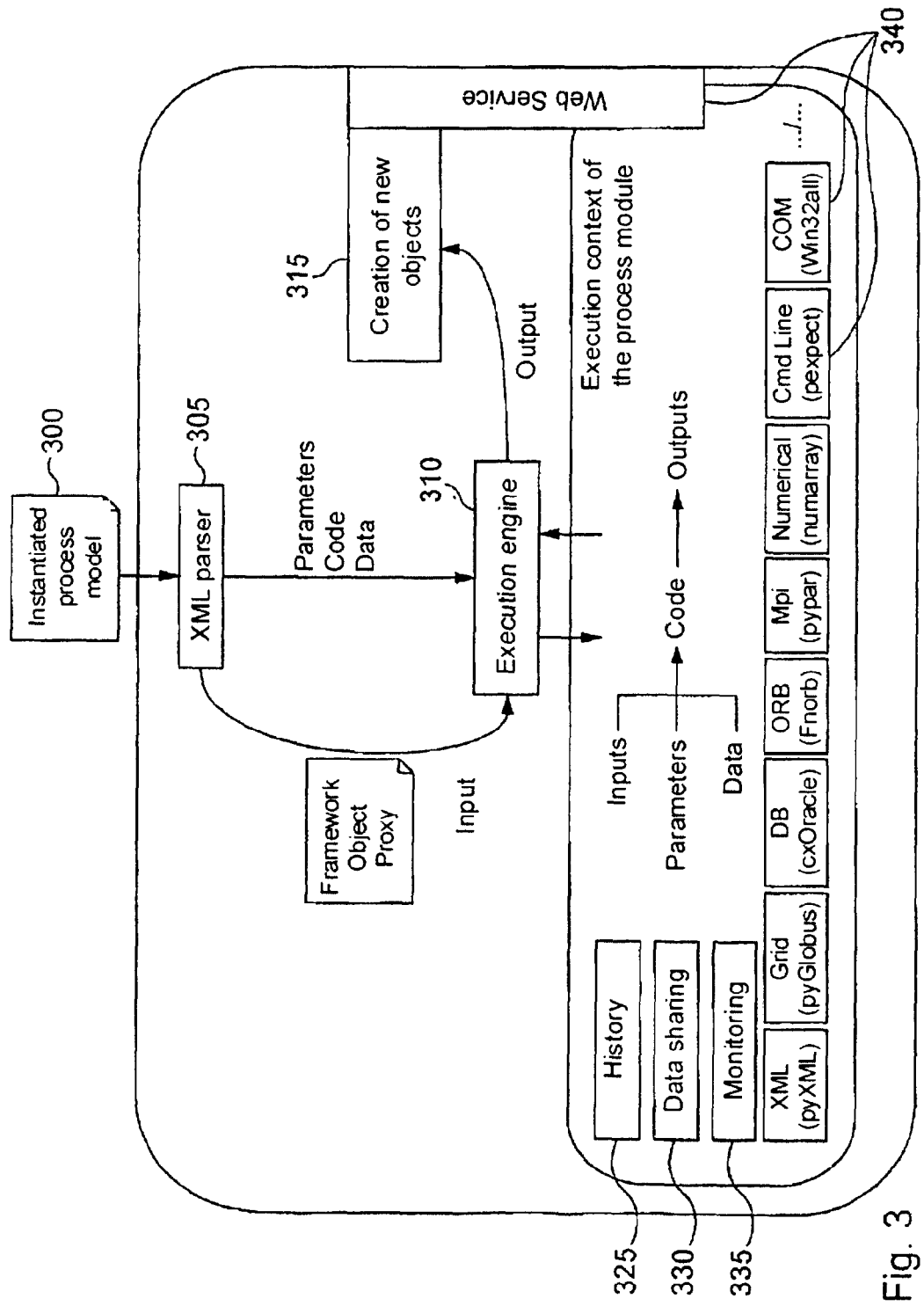
FIG. 3 schematically shows the functional elements of the execution engine illustrated in FIG. 1 as well as the information items transmitted between these elements, for execution of a process based on a representation of Python type.

FIG. 3 schematically shows the functional elements of execution engine 115 illustrated in FIG. 1 as well as the information items transmitted between these elements, for execution of a process based on a representation of Python type. Execution engine 115 is activated by an object consisting of an instantiated process model 300, represented here in the form of a document of XML type.

Instantiated process model 300 is analyzed in a syntax analyzer 305 of XML type, known as XML parser in English terminology, in order to extract from it the information items that permit execution of the process. In particular, the parameters, the code and the information items concerning the data necessary for execution of the process are extracted from the XML document. Similarly, the data used by the process, forming the inputs of the process, are retrieved by means of links to the objects in question. All of the information items necessary for execution of the process and extracted from the XML document are transmitted to core 310 of the execution engine.

The code of instantiated process model 300, or in other words the data associated with the object representing the instantiated process model, corresponds to instructions that can be directly executed by the execution engine, to instructions that can be executed via a specific interface, for example of code of Python type, or to external functions or modules called on by the execution engine, such as ModelCenter functions.

The execution of the process associated with instantiated process model 300 may lead to creation of new objects 315, forming the output of the process. These objects are treated in the same way as the objects described in the foregoing. In particular, metadata and links stored in memory in centralized database 125 as well as data stored in storage zones 130 are associated with these objects. Alternatively or in complementary manner, the input of the process may be modified in the course of execution thereof. The modified inputs forming an output of the process are known as inputs/outputs.

Core 310 of the execution engine preferably relies on an execution environment 320, also known as execution context, of the instantiated process module. The purpose of the execution environment is in particular to preserve a history of execution of the process (325), to make the data accessible in the format of the execution engine (330), for example in the form of objects of Python type, to monitor the execution of the process (335) and to furnish the interfaces 340 necessary for execution of external modules in the core of the execution engine.

When a process is executed, and in particular when new objects are created, one or more links is/are automatically created in the metadata associated with the data used by the process (inputs, outputs and inputs/outputs) as well as in the metadata associated with the instantiated process model.

Before a process is executed, the metadata associated with the instantiated process model comprise references to the objects associated with the data to be used, but do not contain any link. The links are therefore created in each object when the process is executed.

For example, when a process uses a datum to product a result, the following links are created in the course of execution of the process:

a link to the object associated with the process model is created in the object associated with the input datum;

a link to the object associated with the input datum is created in the object associated with the process model;

a link to the object associated with the output datum is created in the object associated with the process model; and a link to the object associated with the process model is created in the object associated with the output datum.

Figure 4:
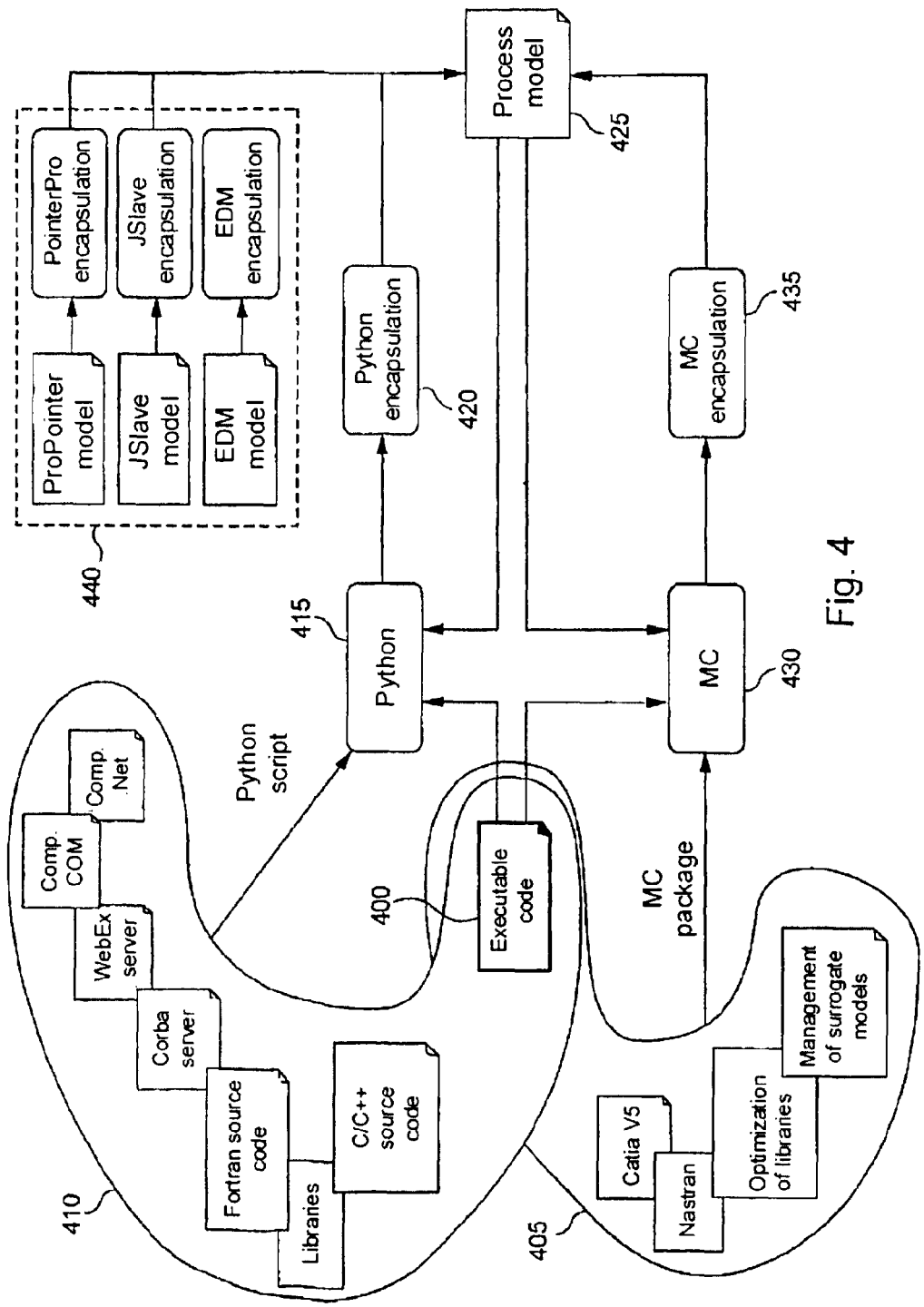
FIG. 4 illustrates the collaborative service-oriented workshop according to the invention from an application viewpoint, permitting execution of executable code obtained from external developments and from specific developments.

FIG. 4 illustrates an example of employment of the collaborative service-oriented workshop according to the invention from an application viewpoint, permitting execution of executable code 400 obtained from external developments (405) and from specific developments (410). As represented, the execution of instantiated process models is recursive.

Depending on the nature of the executable code and the implementation of the collaborative service-oriented workshop, the executable code is executed by the collaborative service-oriented workshop or by an external application. By way of illustration, the executable code is executed in this case by the collaborative service-oriented workshop if it is of Python type and by an external application if it is, for example, of ModelCenter (MC) type.

Figure 5:
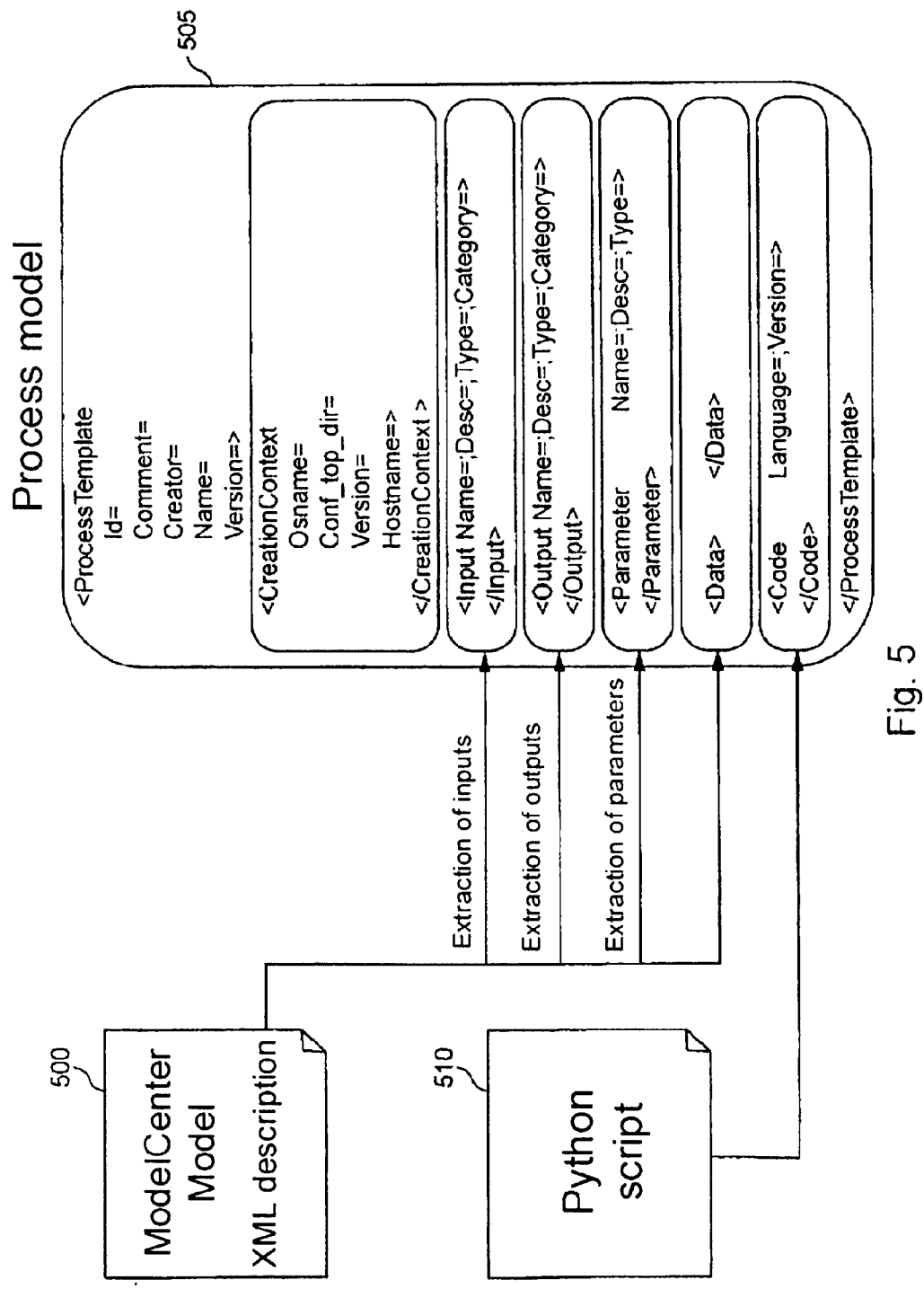
FIG. 5 illustrates an example of encapsulation of an external function of the ModelCenter model type in a process model.

The execution of functions external to the collaborative service-oriented workshop is achieved according to a mechanism of encapsulation of external functions in process models. FIG. 5 illustrates an example of encapsulation of a ModelCenter model in a process model.

If the executable code is of Python type, the data necessary for execution of the code, comprising in particular the references to input and output data as well as to the execution environment, are formatted according to the Python format (module 415). The process formatted in this way is then encapsulated (module 420) in a process model that can be manipulated by the collaborative service-oriented workshop as a standard object (module 425). As illustrated by the arrow connecting module 425 to module 415, the process model uses the Python interface when the process must be executed.

Similarly, if the executable code is of ModelCenter type, the data necessary for execution of the code, comprising in particular the references to input and output data as well as to the execution environment, are encapsulated according to the ModelCenter format (module 430). The process formatted in this way is then encapsulated (module 435) in a process model that can be manipulated by the collaborative service-oriented workshop as a standard object (module 425). Once again, as illustrated by the arrow connecting module 425 to module 430, the process model uses the appropriate interface, which in this case is the ModelCenter interface, when the process must be executed, in order to permit execution of the process outside the collaborative service-oriented workshop.

As suggested by reference 460, other formats may be used.

By means of a man-machine interface, or in other words an interface between modules 420 and 425 and between modules 435 and 425 in this case, the instantiation of the process model may be achieved after encapsulation of the process.

The objective of encapsulation is in particular to adapt the process models according to a predetermined format. In particular, the encapsulation makes it possible to check the validity of data, to determine the necessary parameters and impose default values on missing parameters, and to copy and/or generate the appropriate code. Optionally, the encapsulation also makes it possible to define execution directives, or in other words to define, for example, what are the machines on which the processes or certain parts of processes must be executed.

The encapsulation of external functions in a process model is preferably achieved by means of the following XML sections:

inputs and outputs: links to the objects associated with the data being managed in the collaborative workshop, permitting the use thereof in the external functions;

parameters: parameters used by the external functions; and code: call to the external function.

FIG. 5 illustrates an example of encapsulation of a ModelCenter 500 in a process model 505. As represented, a link is established between each section of the process model and the corresponding fields of the ModelCenter model. The call to the executable code of the ModelCenter model is made here via a Python script 510.

Thus a process model can call up a function external to the collaborative service-oriented workshop. By virtue of the structure of the objects associated with the process models and in particular the links, traceability of the data used as input or output of process models that call up external functions is possible.

Similarly, it is also possible to encapsulate process models in external functions, for example in ModelCenter models. Thus process models developed in the collaborative service-oriented workshop may be used directly by external applications. Via this mechanism, it is possible to use and to link process models to other external functions while preserving, during execution, not only the use of data managed in the collaborative service-oriented workshop but also the associated traceability.

The execution of process models starting from an external application is achieved by the neutral execution module of the integration layer of the collaborative service-oriented workshop, known as SRUN, used to execute the instantiated process models.

In this way a process model can encapsulate external functions and be encapsulated in external functions.

In this double encapsulation mechanism, the degree of traceability of data is therefore determined by the functions executed by the collaborative service-oriented workshop and by external applications.

By way of illustration, if a process model A of the collaborative service-oriented workshop calls up functions B, C and D, where B and C are process models of the collaborative service-oriented workshop and D is a ModelCenter model that itself calls up functions E and F, where E is an external function and F is an encapsulated process model of the collaborative service-oriented workshop, it is possible to follow the links between B, C and D but not between E and F (simply between the input of E and the output of F), executed outside the collaborative service-oriented workshop. In this way it is possible to determine the level of granularity desired for traceability of the data.

As indicated in the foregoing, the data associated with objects characterizing instantiated process models may be represented in the form of files, for example in the form of a file of XML type. The descriptions of process models advantageously comprise several sections, specific to each type of information item.

The process models may themselves be composed of process sub-models, which may be stored in memory in sections of process models. The process sub-models in this case are references to process models accessible in the collaborative service-oriented workshop. In this way it is possible to create composite process models that reference several unitary process models or process models that themselves are composite.

The attributes of an instantiated process model are, for example, the following:

the version of the diagram of XML type that makes it possible to extract the information items from the process model;

the identifier, the name, the version and the type of the process model;

the identifier of the instantiated process model;

the identifier of execution of ModelCenter type if the instantiated process model references a function of ModelCenter type;

the access pathways to the mechanisms that permit execution of the process in secure manner (known as sandboxes in English terminology);

the state of execution of the process model, which specifies the current state of execution of the instantiated process model, for example submitted, in course of execution, executed successfully or executed with error;

the state of the process model defining its internal state, for example primary, partly instantiated, instantiated, in course of execution, or executed; and comments.

The section relating to the inputs, the outputs, the inputs/outputs and the parameters of an instantiated process model comprises, for example, the name, the type and the category. Other items of information may be associated with the inputs, the outputs, the inputs/outputs and the parameters of an instantiated process model, such as the type of user concerned, a description and a help feature. One section is used for each input, output, input/output and parameter.

The section relating to the execution context of an instantiated process model comprises a classification section specifying the tools used during execution of the instantiated process model. The section relating to the execution context of an instantiated process model also comprises a section for context creation, making it possible to store the execution context of the instantiated process model in memory, as well as a section for current execution context, specifying the configuration to be used to execute the process and making it possible to store the choices to be effected by the calculation grid controller in memory. The section relating to the execution context of an instantiated process model may also comprise an execution server section to specify the configuration of the calculation grid chosen during instantiation of the process model as well as an execution report section, filled out at the end of execution of the process and containing, for example, an error code or art-specific information items relating to the execution of the process. The attributes of the sections of creation of context and of current execution context are, for example, the following:

the name and type of the machine used to execute the process as well as its type of operating system; and the date of creation of the context or of execution of the process.

The section relating to the data of an instantiated process model is provided in order to store in memory the private data of the process model that are available during execution of the process. This section may itself comprise sections such as sections specific to particular processes, such as processes of the ModelCenter type.

The section relating to the code of an instantiated process model comprises the code of the process to be executed. The attributes of this section are, for example, the language used, such as the Python language, the version of the code and if necessary comments.

Furthermore, an instantiated process model may comprise a description of the list of available servers and/or of servers preferred for execution of the process.

Figure 6:
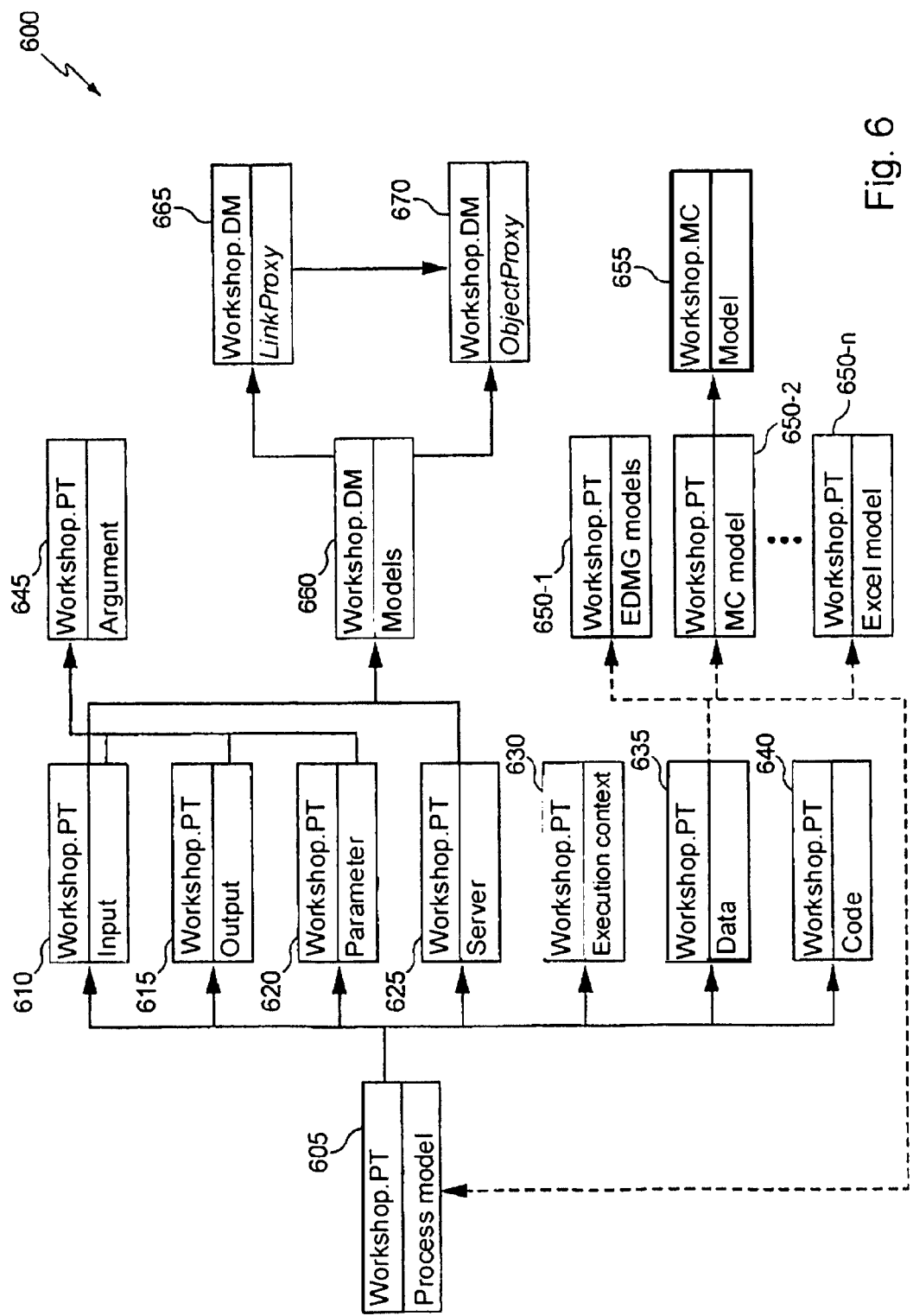
FIG. 6 synthetically illustrates an example of a diagram of the XML type for analysis of a process model stored in memory in the form of a description of XML type.

FIG. 6 synthetically illustrates an example of a diagram 600 of XML type for analysis of a process model stored in memory in the form of a description of XML type. Diagram 600 of XML type describes the different sections contained in a file representing a process model as well as links to the sections of XML type of the data-management and process-management parts.

The links represented in solid bold lines represent inclusion, the links in solid lines represent the notion of importation and the links in dashed lines represent the implicit notion of importation.

The extensions of PT type (Process Template) are associated with process models, or in other words with the execution engine, the extensions of DM type (Data Management) are associated with data, or in other words with the data manager, and the extensions of MC type are associated with ModelCenter, or in other words with a particular process manager.

As illustrated, a process model 605 comprises a plurality of subassemblies 610 to 640, which in the present case correspond to sections for inputs, for outputs, for parameters, for servers, for the execution context, for data and for the code, respectively. The sections linked to the inputs, to the outputs and to the parameters themselves comprise arguments 645.

The process model implicitly comprises the information items relating to specific models 650-1 to 650-n, such as the EDMG models (initials for Editeur De Modèle Généralisé [Generalized Model Editor]), ModelCenter and Excel (Excel is a trademark). The ModelCenter model of the process model receives information items from a particular model 655.

It is noted here that the Excel model uses a reference to the function to be used, for example a URL (initials for Uniform Resource Locator in English terminology), while the Model-Center is included in the process model by virtue of encapsulation.

The data specified in Sections 610, 615 and 620 are obtained from objects 660, which themselves comprise links (665 and 670) to other objects.

Thus references 600 to 650 are associated with the generic process model, while the set of references corresponds to an instantiated process model. It nevertheless should be noted here that parameters 520 may also be modified manually by the user.

Figure 7:
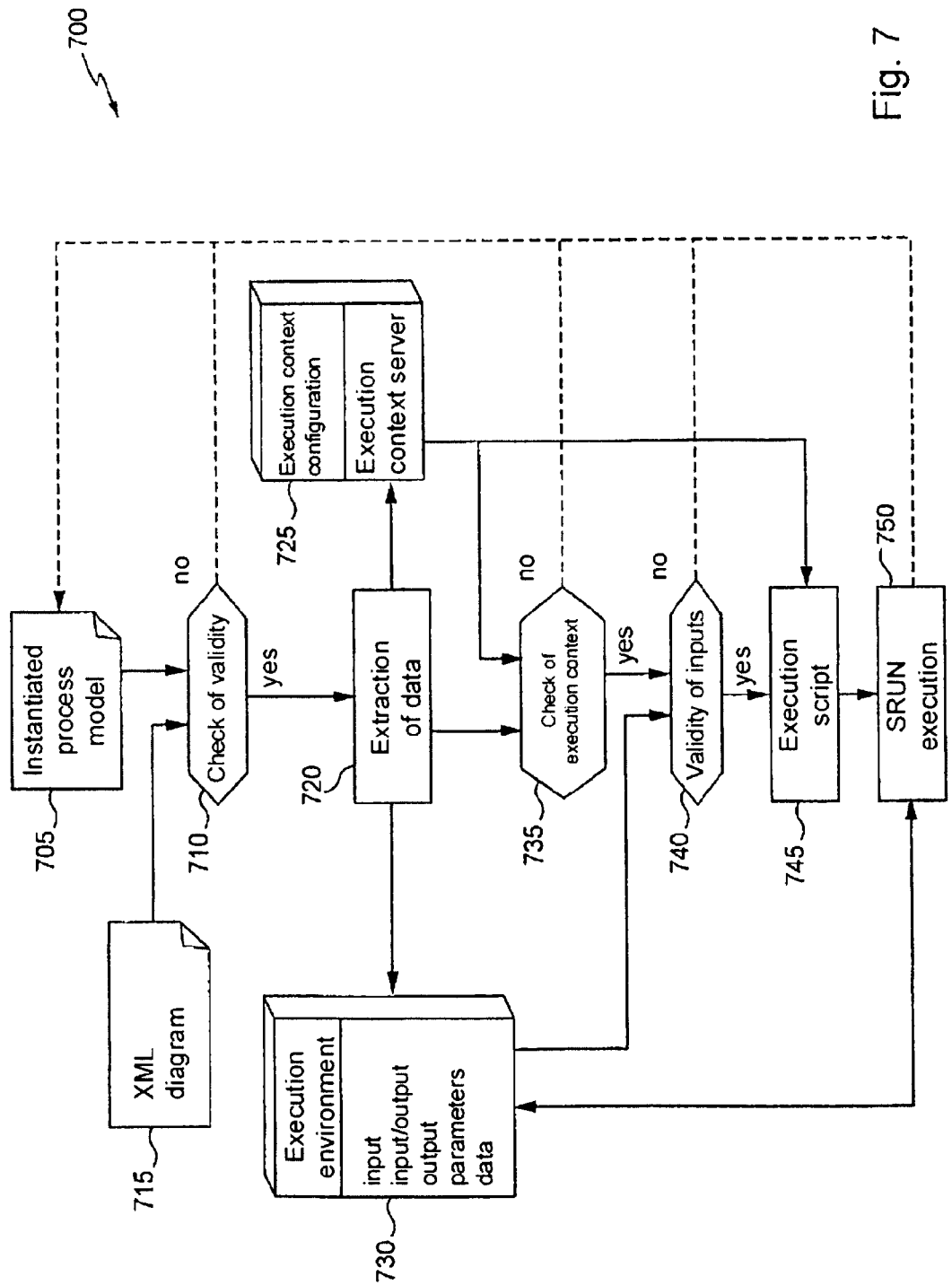
FIG. 7 illustrates an example of an algorithm for execution of unitary processes of instantiated process models.

FIG. 7 illustrates an example of an algorithm 700 for execution of unitary processes of instantiated process models.

Instantiated process model 705 is analyzed first of all (step 710) in order to check its validity by means of a predetermined XML diagram 715. If it is not valid, execution of the process is stopped and another instantiated process model may be treated. If the instantiated process model is valid, the information items contained in this model are extracted (step 720).

The extraction of information items makes it possible in particular to determine execution context configuration 725 as well as execution environment 730, which in particular may comprise the inputs, the outputs, the inputs/outputs, the parameters and/or the data inherent to the instantiated process model. According to a preferred embodiment, execution context configuration 725 and the execution environment are determined according to the Python format.

The execution context configuration is then checked according to the validity of the execution domain (step 735). In fact, the creator of a process has the option of specifying a validity domain, for example a specific software version. If a user wishes to use a different version, he may be prompted or forced to change his choice, since the validity condition of the execution domain is not satisfied. If the configuration is not valid, execution of the process is stopped and another instantiated process model may be treated.

If the configuration is valid, the conditions on the inputs and the inputs/outputs are verified (step 740). During instantiation of the process, it may be that the user referenced an object that cannot be used in this process because it does not satisfy the conditions defined by the creator of the process. In the given example concerning the table and the chair, the furniture-removal process may have as a condition, for example, a specific color of the chair. If the user chooses a chair of a different color, the furniture-removal process cannot take place. If the conditions on the inputs and the inputs/outputs are not valid, execution of the process is stopped and another instantiated process model may be treated.

If the conditions on the inputs and the inputs/outputs are valid, execution of the process proceeds according to the code of the instantiated process model (step 745), or in other words according to the data associated with the object representing the instantiated process model.

The code of the instantiated process model is then executed (step 750). In general, the core of the execution module, known as SRUN, loads the inputs, the inputs/outputs as well as the Python modules necessary for execution of the code into memory. If necessary, a distributed execution environment based on the capacities of the SRUN execution module may be employed.

In the case of composite instantiated process models, the SRUN execution module creates instances of process sub-models in memory and executes them successively as unitary instantiated process models. Coherence between the different unitary processes is then assured by the engine that executes the flow of jobs or workflow.

During the execution of the process, the script containing the code is executed in the corresponding execution environment, possibly on a machine different from that of the data manager, according to the choice of calculation grid manager. Preferably, the mechanisms that permit execution of the process in secure manner are used to read and write the physical data, to store the history of execution of the process in memory and to store data temporarily in memory.

After execution of the script, or in other words the process, the execution engine transmits the outputs to the appropriate domain and stores the execution report in memory.

Figure 8:
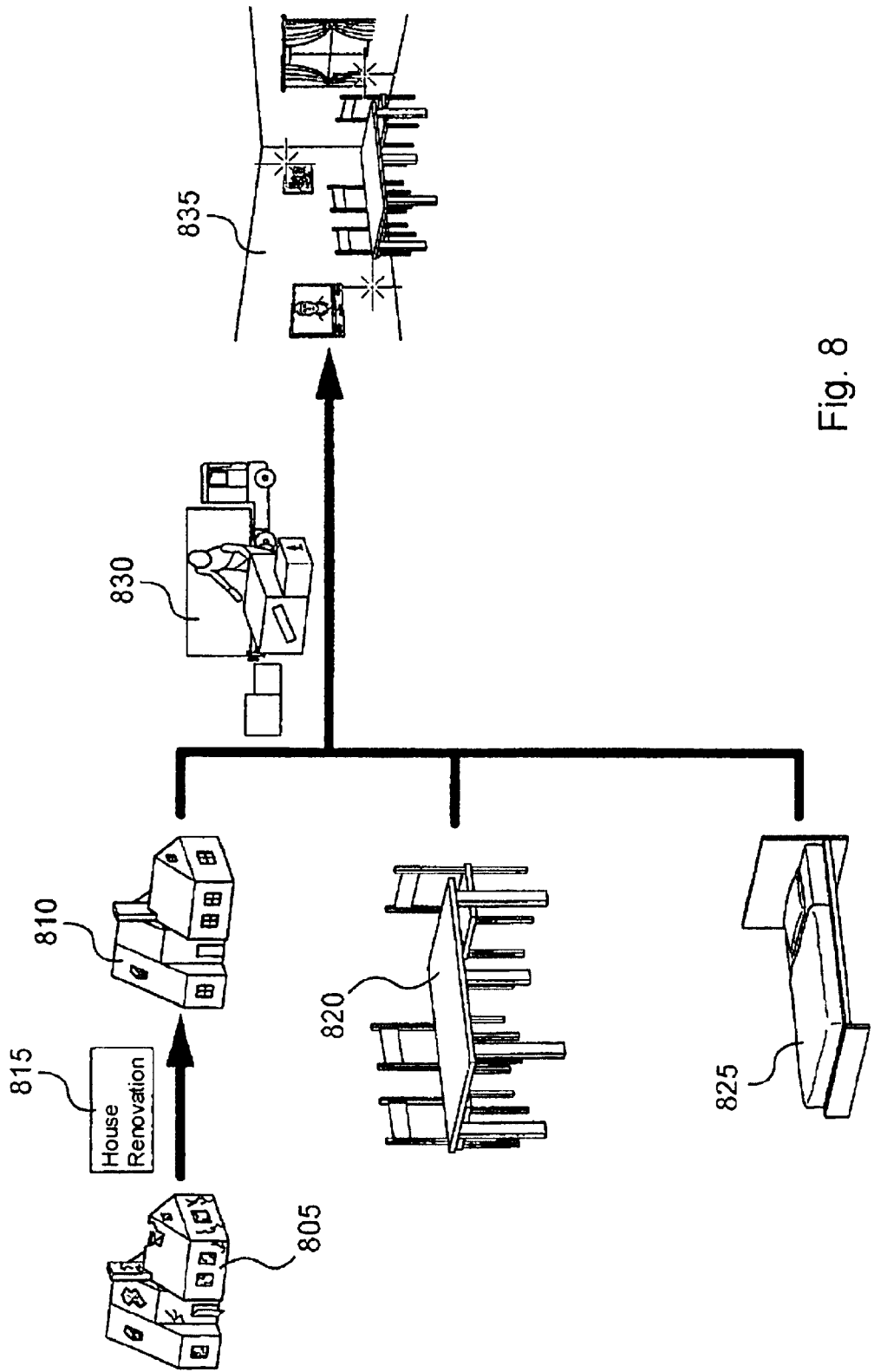
FIG. 8 illustrates an example of data processing that can be performed from a collaborative service-oriented workshop according to the invention.

FIG. 8 illustrates an example of data processing 800 that can be achieved in a collaborative service-oriented workshop according to the invention. According to this example, data 805 correspond to information items relating to a house in ruins. An object referencing metadata is associated with these data, indicating the ruined state as well as other information items deemed to be pertinent, in this case the number of rooms and the number of windows. Data 810 correspond to information items relating to a habitable house. Once again, an object referencing metadata is associated with these data, indicating a state, in this case the habitable state, as well as information items deemed to be pertinent, in other words the number of rooms and the number of windows in this case. Data 810 may be obtained from the object linked to data 805 and therefore from data 805, by means of an object representing an instantiated renovation process model 815.

Similarly, the object corresponding to data 810 may be combined with an object of dining room type linked to data 820 and with an object of bed type linked to data 825 in an instantiated furniture-removal process 830 in order to create an object of inhabited house type linked to data 835. In this case the metadata linked to data 835 indicate the inhabited state as well as the number of rooms and windows.

The example given in the Annex under the reference "Code excerpt 3" illustrates a simplified example of metadata associated with the data 805 of FIG. 8 before execution of the renovation process.

As indicated in this example, the metadata comprise generic information items, especially the type and name of the object as well as the link for accessing the corresponding datum, and specific information items, in this case the state, the number of windows and the number of rooms. It should be noted that the metadata are of the IN type, meaning that they do not correspond to data created by an instantiated process model.

The renovation process model that can be used to treat the foregoing example representing a house in ruins may be described generically in the way presented in the Annex under the reference "Code excerpt 4".

This process model has as input an object of house type and creates as output another object of house type. This process model may be instantiated to contain, in particular, references to objects associated with data 805 and 810 of FIG. 8. The instantiated process model is then, for example, that given in the Annex under the reference "Code excerpt 5".

As indicated, the instantiated process model additionally comprises execution parameters, the identification of the execution machine, the application configuration used and the execution history links between the objects associated with data 805 and with instantiated process model 815 and between the objects associated with instantiated process model 815 and data 810.

After execution of the process corresponding to this instantiated process model, the metadata linked to data 805 are modified in order to add a history link permitting traceability of the data. After execution of the process, therefore, the metadata associated with data 805 may be represented in the way given in the Annex under the reference "Code excerpt 6".

As indicated in this example, a link was created between the objects associated with data 805 and with instantiated process model 815. Thus, by means of the object associated with instantiated process model 815, it is possible to establish a link between the objects associated with data 805 and 810.

Similarly, after execution of the process, data 810 as well as the metadata associated with them, including the links, are created. The metadata associated with data 810 may then be represented in the way given in the Annex under the reference "Code excerpt 7".

As in the foregoing, a link was created between the object associated with data 810 and the object associated with instantiated process model 815. Thus, by means of the object associated with instantiated process model 815, it is possible to establish the link existing between data 805 and 810. It should be noted that the metadata in this case are of the OUT type, meaning that they correspond to data created by an instantiated process model in the collaborative service-oriented workshop.

In the same way, a second process model may be created and instantiated to treat data 810, 820 and 825 in order to create data 835 and the associated object. When the second instantiated process model 830 characterizing a furniture-removal process is executed, the metadata associated with data 810 are modified in order to integrate the link induced by execution of instantiated process model 830. The metadata associated with data 810 may then be expressed in the form given in the Annex under the reference "Code excerpt 8".

The link created between the object associated with data 810 and the object associated with instantiated process model 830 makes it possible, by means of this object, to establish the link between the objects associated with data 810 and 835.

Furthermore, data 835 as well as the associated object are created during execution of second instantiated process model 830. The associated metadata may be represented in the form given in the Annex under the reference "Code excerpt 9".

The link created between the object associated with data 835 and the object associated with instantiated process model 830 makes it possible, by means of this object, to determine the links between the objects associated with data 835 and 810, between the objects associated with data 835 and 820 as well as between the objects associated with data 835 and 825.

Figure 9:
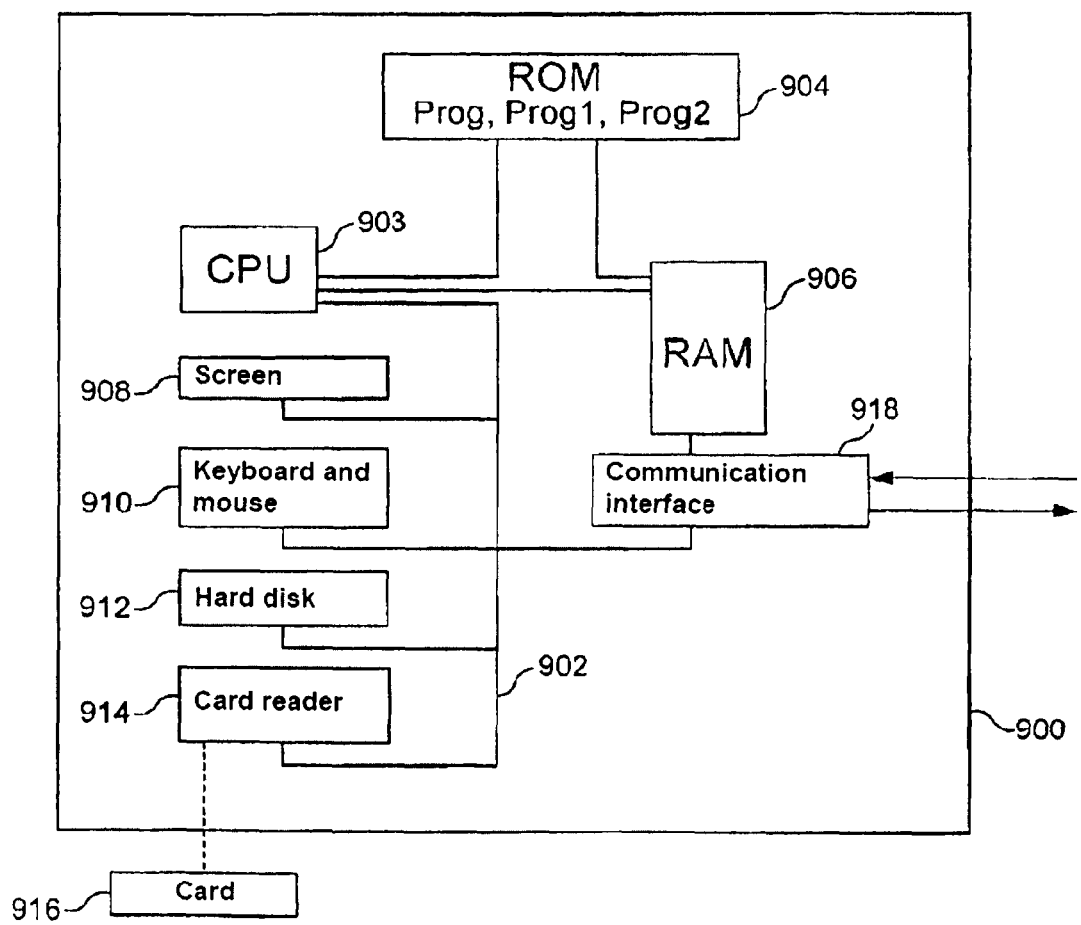
FIG. 9 illustrates an example of a device adapted to employ part of the invention.

A device adapted to employ part of the invention is illustrated in FIG. 9. Device 900 is, for example, a microcomputer, a computer or a workstation.

In the present case, device 900 is provided with a communication bus 902, to which there are connected:

a central processing unit or microprocessor 903 (CPU, Central Processing Unit in English terminology);

a read-only memory 904 (ROM, acronym for Read Only Memory in English terminology), which may be provided with the programs "Prog", "Prog1" and "Prog2";

a random access memory or cache memory 906 (RAM, acronym for Random Access Memory in English terminology), which is provided with registers adapted for recording variables and parameters created and modified in the course of execution of the aforesaid programs; and a communication interface 918 adapted for transmitting and receiving data.

Optionally, device 900 may also be provided with:

a screen 908, for visualizing data and/or for acting as a graphical interface with the user, who will be able to interact with the programs according to the invention, by means of a keyboard and a mouse 910, or of another pointing device, a touch screen or a remote control;

a hard disk 912, which can comprise the aforesaid programs "Prog", "Prog1" and "Prog2" and data processed or to be processed according to the invention; and a memory card reader 914 adapted for receiving a memory card 916 and reading or writing therein data processed or to be processed according to the invention.

The communication bus permits communication and interoperability between the different elements included in device 900 or connected thereto. The representation of the bus is not limitative and, in particular, the central unit is capable of communicating instructions to any element of device 900 directly or via another element of device 900.

The executable code of each program allowing the programmable device to employ the processes according to the invention may be stored, for example, on hard disk 912 or in read-only memory 904.

According to one variant, memory card 916 may contain data as well as the executable code of the aforesaid programs, which code will be stored on hard disk 912 once it has been read by device 900.

According to another variant, it will be possible for the executable code of the programs to be received at least partly via interface 918, to be stored in a manner identical to that described in the foregoing.

More generally, it will be possible for the program or programs to be loaded into one of the storage means of device 900 before being executed.

Central unit 903 will command and direct the execution of the instructions or portions of software code of the program or programs according to the invention, which instructions are stored on hard disk 912 or in read-only memory 904 or else in the other aforesaid storage elements. During boot-up, the program or programs stored in a non-volatile memory, such as hard disk 912 or read-only memory 904, are transferred into random-access memory 906, which then contains the executable code of at least part of the program or programs according to the invention as well as registers for storing in memory the variables and parameters necessary for employment of the invention.

Naturally, to satisfy specific needs, a person skilled in the area of the invention will be able to apply modifications in the foregoing description.

TABLE 1

| | | | metadata | | | | |
|---|---|---|---|---|---|---|---|
| | | generic | | | specific | | |
| ID | date | URL | type | num feet | material | color | weight |
| 1 | 12 Sep 07 | http://x.y/z/ | element | 3 | wood | red | 3500 |
| ... | ... | ... | ... | ... | ... | ... | ... |
| n | 29 Jan 08 | http://m.n/o/p/q/ | element | 4 | metal | green | 1800 |

TABLE 2

| ID1 | 5 | 8 | 3 | 5 | ... | ... | ... | ... |
|---|---|---|---|---|---|---|---|---|
| ID2 | 8 | 5 | 1 | 1 | ... | ... | ... | ... |

ANNEX

Code excerpt 1:

```
<Workshop.DM:FrameworkMetaData>
    <Workshop.DM:Attributes. Generic />
    <Workshop.DM:Attributes.Specific />
</Workshop.DM:FrameworkMetaData>
```

Code excerpt 2:

```
<Workshop.DM:FrameworkMetaData
xmlns:Workshop.DM="http://www.company.com/egat/Workshop/DM">
    <Workshop.DM:Attributes.Generic  acl_name="Private"  comments="None"
creation_date="2006-04-27  10:29:43"  db_type="ELEMENT"
external id="chair number_0010100432325"  id="1411"  lock_owner="None"  lock_state="0"
mdb_instance="MDB_operating"  modification_date="2006-04-27  10:29:43"  name="chair1"
owner="lastname_firstname"  publication_level="Private"  shared_state="None"  site="Toulouse"
source="LOCAL"  status="Private"  version_comments="None"  version_number="None"
version_owner="None"  version_state="None"  version_ tag="None"/>
    <Workshop.DM:Attributes.Specific  num_feet="4"  thickness="5cm"
color="red"  material="wood"  weight="2kg"/>
</Workshop.DM:FrameworkMetaData>
```

Code excerpt 3:

```
<Workshop.DM:EEObjectProxy   xmlns:Workshop.DM="http://www.company.com/egat/Workshop/DM"
publish="0" state="0" type="IN">
    <Workshop.DM:OriginalPointer>
        <Workshop.DM:Pointer external_id="description for access to the physical datum"/>
    </Workshop.DM:OriginalPointer>
    <Workshop.DM:ObjectProxy type="HOUSE">
```

ANNEX

```
        <Workshop.DM:Pointer external_id="description for access to the physical datum"/>
      <Workshop.DM:FrameworkMetaData
xmlns:Workshop.DM="http://www.company.com/egat/Workshop/DM">
        <Workshop.DM:Attributes.Generic  acl_name="Private"  db_type="HOUSE"
external_id="description    for    access    to    the    physical    datum"   id="identifier"
mdb_instance="MDB_operating"   modification_date=""  name="my blue house"    source="CMSDK"
status="Private"/>
        <Workshop.DM:Attributes.Specific state="in ruins" num_windows="4" num_pieces="10">
      </Workshop.DM:FrameworkMetaData>
    </Workshop.DM:ObjectProxy>
          </Workshop.DM:EEObjectProxy>
```

Code excerpt 4:

```
<?xml version="1.0" ?>
      <Workshop.PT:ProcessTemplate     comment="my     first     treatment"    creator="creator"
id="identifier"   name="Renovation   house"   diagramVersion="0.1"     state="primary"
execution_state="not_submitted"              type="action"              version="0.1"
xmlns:Workshop.DM="http://www.company.com/egat/Workshop/DM"
xmlns:Workshop.MC="http://www.company.com/egat/Workshop/MC"
xmlns:Workshop.PT="http://www.company.com/egat/Workshop/PT"
xmlns:xsi="http://www.w3.org/2001/XMLDiagram-instance"
xsi:diagramLocation="http://www.company.com/egat/Workshop/PT    Workshop.PT.ProcessTemplate.xsd
http://www.company.com/egat/Workshop/DM Workshop.DM.xsd">
      <Workshop.PT:SandboxPointer external_id="" source_name="" source_site=""
source_type= ""type=""/>
        <Workshop.PT:Input category="object"desc="house in ruins" name=""type="HOUSE">
          <Workshop.PT:Condition>
            <![CDATA[number of windows >3]]>
          </Workshop.PT:Condition>
        </Workshop.PT:Input>
        <Workshop.PT:Output category="object" desc="habitable house" name="" type="HOUSE">
        </Workshop.PT:Output>
        <Workshop.PT:Parameter desc="execution parameters" name="para_list" type="list"/>
        <Workshop.PT:Server>
          <Workshop.PT:ValidServer>
            <![CDATA[key word and values describing the machine characteristics]]>
          </Workshop.PT:ValidServer>
          <Workshop.PT:DefaultServer>
            <![CDATA[key word and default characteristic values of the machine]]>
          </Workshop.PT:DefaultServer>
        </Workshop.PT:Server>
        <Workshop.PT:ExecutionContext>
          <Workshop.PT:Classification processType="batch">
            <Workshop.PT:Suite name="Suite1"/>
            <Workshop.PT:Tool name="Tool1"/>
          </Workshop.PT:Classification>
          <Workshop.PT:CreationContext class="" date="" hostname="" osname="" type="">
            <![CDATA[[configuratiord key word and value describing the default application
configuration
            [validity] validity condition of the application configuration]]>
          </Workshop.PT:CreationContext>
        </Workshop.PT:ExecutionContext>
      <Workshop.PT:Data/>
      <Workshop.PT:Code comment="comment on the code" language="python"version="">
        <![CDATA[Code to be executed]]>
      <Workshop.PT:Code>
          </Workshop.PT:ProcessTemplate>
```

Code excerpt 5:

```
<?xml version="1.0" ?>
      <Workshop.PT:ProcessTemplate comment="my first treatment" creator="creator"
id="identifier" name="Renovation house" diagramVersion="0.1" state="primary"
execution_state="not submitted" type="action" version="0.1"
xmlns:Workshop.DM="http://www.company.com/egat/Workshop/DM"
xmlns:Workshop.MC="http://www.company.com/egat/Workshop/MC"
xmlns:Workshop.PT="http://www.company.com/egat/Workshop/PT"
xmlns:xsi="http://www.w3.org/2001/XMLDiagram-instance"
xsi:diagramLocation="http://www.company.com/egat/Workshop/PT Workshop.PT.ProcessTemplate.xsd
http://www.company.com/egat/Workshop/DM Workshop.DM.xsd">
        <Workshop.PT:SandboxPointer external_id="" source_name="/>
        <Workshop.PT:Input category="object" desc="house    in    ruins"    name="Datum_805"
type="HOUSE">
        <Workshop.PT:Condition>
            <![CDATA[number of windows >3]]>
        </Workshop.PT:Condition>
          <Workshop.DM:EEObjectProxy publish="0" state="0" type="IN">
            <Workshop.DM:OriginalPointer>
          <Workshop.DM:Pointer external_id="description for access to the physical datum"/>
```

-continued

ANNEX

```
        <Workshop.DM:OriginalPointer>
        <Workshop.DM:ObjectProxy type="HOUSE">
          <Workshop.DM:Pointer external_id="description for access to the physical datum"/>
          <Workshop.DM:FrameworkMetaData
xmlns:Workshop.DM="http://www.company.com/egat/Workshop/DM">
            <Workshop.DM:Attributes.Generic acl_name="Private"    db_type="HOUSE"
external_id="description for access to the physical datum" id="identifier"
mdb_instance="MDB_operating" modification_date="" name="my    blue    house"    source="CMSDK"
status="Private"/>
            <Workshop.DM:Attributes.Specific state="in ruins" num_windows="4"
num_pieces="10" />
            <Workshop.DM:Links>
              <Workshop.DM:Link    comments="description  of  the  link"  date=""
id_FO_1="identifier    datum    805" id_FO_2="identifier    IPT    815" mdb_instance="MDB_operating"
owner="to39751"    subtype="link    subtype"    type="HISTORY"
xmlns:Workshop.DM="http://www.company.com/egat/Workshop/DM"/>
            </Workshop.DM:Links>
          </Workshop.DM:FrameworkMetaData"">
        </Workshop.DM:ObjectProxy>
      </Workshop.DM:EEObjectProxy>
    </Workshop.PT:Input>
    <Workshop.PT:Output category="object" desc="habitable    house" name="Datum_810"
type="HOUSE">
      <Workshop.DM:EEObjectProxy publish="1" state="1" type="OUT">
        <Workshop.DM:SandboxPointer>
          <Workshop.DM:Pointer external_id="description for access to the sandbox"
source_name="" source_site="" source_type="" type=""/>
        <Workshop.DM:SandboxPointer>
        <Workshop.DM:FinalPointer>
          <Workshop.DM:Pointer external_id="description for access to the physical datum"/>
        </Workshop.DM:FinalPointer>
      <Workshop.DM:ObjectProxy type="HOUSE">
        <Workshop.DM:Pointer external_id="description for access to the physical datum"/>
        <Workshop.DM:FrameworkMetaData
xmlns:Workshop.DM="http://www.company.com/egat/Workshop/DM">
            <Workshop.DM:Attributes.Generic acl_name="Private"    db_type="HOUSE"
external_id="description  for    access  to  the  physical  datum"    id="identifier"
mdb_instance="MDB_operating"    modification_date=""    name="my blue house"    source="CMSDK"
status="Private"/>
            <Workshop.DM:Attributes.Specific    state="habitable"    num_windows="6"
num_pieces="12"/>
            <Workshop.DM:Links>
              <Workshop.DM:Link    comments="description  of  the  link"    date=""
id_FO_1="identifier    IPT 815"    id_FO_2="identifier    Datum    810"
mdb_instance="MDB_operating"
owner="to39751"    subtype="link    subtype"    type="HISTORY"
xmlns:Workshop.DM="http://www.company.com/egatA/Workshop/DM"/>
            </Workshop.DM:Links>
          </Workshop.DM:FrameworkMetaData>
        </Workshop.DM:ObjectProxy>
      </Workshop.DM:EEObjectProxy>
    </Workshop.PT:Output>
    <Workshop.PT:Parameter desc="execution parameters" name="para_list" type="list">
      <Workshop.PT:ParameterValue>
        <![CDATA[ execution parameter]]>
      <Workshop.PT:ParameterValue>
    </Workshop.PT:Parameter>
    <Workshop.PT:Server>
      <Workshop.PT:ValidServer>
        <![CDATA[key word and values describing the machine characteristics]]>
      </Workshop.PT:ValidServer>
      <Workshop.PT:DefaultServer>
        <![CDATA[key word and default characteristic values of the machine]]>
      </Workshop.PT:DefaultServer>
    <Workshop.PT:Server>
    <Workshop.PT:ExecutionContext>
      <Workshop.PT:Classification processType="batch">
        <Workshop.PT:Suite name="Suite1"/>
        <Workshop.PT:Tool name="Tool1"/>
      </Workshop.PT:Classification>
      <Workshop.PT:CreationContext class="" date="" hostname="" osname="" type="">
        <![CDATA[[configuration] key word and value describing the default application
configuration
        [validity] validity condition of the application configuration]]/>
      <Workshop.PT:CreationContext>
      <Workshop.PT:RunContext class="" date=""hostname="" osname=""type="">
        <![CDATA[[configuration] key word and value describing the application configuration
used]]>
```

ANNEX

```
    </Workshop.PT:RunContext>
    <Workshop.PT:RunServer>
      <![CDATA[[ key word and value describing the execution machine used]] />
    </Workshop.PT:RunServer>
    <Workshop.PT:ExecutionReport return_code="0">
      <![CDATA[ Execution report ]]>
    </Workshop.PT:ExecutionReport>
    <Workshop.PT:ExecutionContext>
  <Workshop.PT:Data />
  <Workshop.PT:Code comment="comment on the code" language="python" version="">
    <![CDATA[ Code to be executed]]>
  </Workshop.PT:Code>
      </Workshop.PT:ProcessTemplate>
```

Code excerpt 6:

```
<Workshop.DM:EEObjectProxy xmlns:Workshop.DM="http://www.company.com/egat/Workshop/DM"
publish="0" state="0" type="IN">
  <Workshop.DM:OriginalPointer>
    <Workshop.DM:Pointer external_id="description  for  access  to  the  physical  datum"
source_name="" source_site="" source_type="" type=""/>
  <Workshop.DM:OriginalPointer>
  <Workshop.DM:ObjectProxy type="HOUSE">
    <Workshop.DM:Pointer external_id="description for access to the physical datum"/>
    <Workshop.DM:FrameworkMetaData
xmlns:Workshop.DM="http://www.company.com/egat/Workshop/DM">
      <Workshop.DM:Attributes.Generic acl_name="Private" db_type="HOUSE"
external_id="description for access to the physical datum id"="identifier"
mdb_instance="MDB_operating" modification_ date="" name="my blue house" source="CMSDK"
status="Private "/>
      <Workshop.DM:Attributes.Specific state="in ruins" num_windows="4" num_pieces="10"/>
      <Workshop.DM:Links>
      <Workshop.DM:Link  comments="description  of  the  link" date="" id_FO_1="identifier
Datum 805"  id_FO_2="identifier  IPT 815"  mdb_instance="MDB_operating"  owner="to39751"
subtype="link                      subtype"                     type="HISTORY"
xmlns:Workshop.DM="http://www.company.com/egat/Workshop/DM" />
      <Workshop.DM:Links>
    </Workshop.DM:FrameworkMetaData>
  </Workshop.DM:ObjectProxy>
      </Workshop.DM:EEObjectProxy>
```

Code excerpt 7:

```
<Workshop.DM:EEObjectProxy    xmlns:Workshop.DM="http://www.company.com/egat/Workshop/DM"
publish="1" state="1" type="OUT">
    <Workshop.DM:SandboxPointer>
      <Workshop.DM:Pointer external_id="description for access to the sandbox"/>
    <Workshop.DM:SandboxPointer>
    <Workshop.DM:FinalPointer>
      <Workshop.DM:Pointer external_id="description for access to the physical datum"/>
    <Workshop.DM:FinalPointer>
    <Workshop.DM:ObjectProxy type="HOUSE">
      <Workshop.DM:Pointer external_id="description for access to the physical datum"/>
      <Workshop.DM:FrameworkMetaData
xmlns:Workshop.DM="http://www.company.com/ega/Workshop/DM">
        <Workshop.DM:Attributes.Generic    acl_name="Private"    db_type="HOUSE"
external_id="description for access to the physical datum" id="identifier"
mdb_instance="MDB_operating"  modification_date=""   name="my   blue   house"   source="CMSDK"
status="Private"/>
        <Workshop.DM:Attributes.Specific state="habitable" num_windows="6" num_pieces="12" />
        <Workshop.DM:Links>
        <Workshop.DM:Link comments="description of the link" date="" id_FO_1="identifier IPT
815"    id_FO_2="identifier    Datum    810"    mdb_instance="MDB_operating"    owner="to39751"
subtype="link                     subtype"                     type="HISTORY"
xmlns:Workshop.DM="http://www.company.com/egat/Workshop/DM" />
          <Workshop.DM:Links>
        <Workshop.DM:FrameworkMetaData>
      <Workshop.DM:ObjectProxy>
          </Workshop.DM:EEObjectProxy>
```

Code excerpt 8:

```
<Workshop.DM:EEObjectProxy xmlns:Workshop.DM="http://www.company.com/egat/Workshop/DM"
publish="1" state="1" type="OUT">
      <Workshop.DM:SandboxPointer>
        <Workshop.DM:Pointer external_id="description for access to the sandbox" source_name=""
source_site="" source_type="" type="" />
      </Workshop.DM:SandboxPointer>
      <Workshop.DM:FinalPointer>
        <Workshop.DM:Pointer external_id="description for access to the physical datum"/>
      <Workshop.DM:FinalPointer>
```

-continued

ANNEX

```
<Workshop.DM:ObjectProxy type="HOUSE">
    <Workshop.DM:Pointer external_id="description for access to the physical datum"/>
    <Workshop.DM:FrameworkMetaData
xmlns:Workshop.DM="http://www.company.com/egat/Workshop/DM">
        <Workshop.DM:Attributes.Generic   acl_name="Private"   db_type="HOUSE"
external_id="description for access to the physical datum" id="identifier"
mdb_instance="MDB_operating"   "modification_date=""   name="my blue house source="CMSDK"
status="Private"/>
        <Workshop.DM:Attributes.Specific state="habitable" num_windows="6" num_pieces="12" />
        <Workshop.DM:Links>
            <Workshop.DM:Link comments="description of the link" date="" id_FO_1="identifier IPT
815"   id_FO_2="identifier   Datum   810"   mdb_instance="MDB_operating"   owner-"to39751"
subtype="link                 subtype"                 type="HISTORY"
xmlns:Workshop.DM="http://www.company.com/egat/Workshop/DM" />
            <Workshop.DM:Link comments="description of the link" date="" id_FO_1="identifier
Datum   810"   id_FO_2="identifier   IPT 830"   mdb_instance="MDB_operating"   owner="to39751"
subtype="link                 subtype"                 type="HISTORY"
xmlns:Workshop.DM="http://www.company.com/egat/Workshop/DM" />
        </Workshop.DM:Links>
    </Workshop.DM:FrameworkMetaData>
</Workshop.DM:ObjectProxy>
    </Workshop.DM:EEObjectProxy>
```

Code excerpt 9:

```
<Workshop.DM:EEObjectProxy    xmlns:Workshop.DM="http://www.company.com/egat/Workshop/DM"
publish="1" state="1" type="OUT">
    <Workshop.DM:SandboxPointer>
        <Workshop.DM:Pointer external_id="description for access to the sandbox"/>
    </Workshop.DM:SandboxPointer>
    <Workshop.DM:FinalPointer>
        <Workshop.DM:Pointer external_id="description for access to the physical datum"!>
    </Workshop.DM:FinalPointer>
    <Workshop.DM:ObjectProxy type="HOUSE">
        <Workshop.DM:Pointer external_id="description for access to the physical datum"/>
        <Workshop.DM:FrameworkMetaData
xmlns:Workshop.DM="http://www.company.com/egat/Workshop/DM">
            <Workshop.DM:Attributes.Generic   acl_name="Private"   db_type="HOUSE"
external_id="description for access to the physical datum"   id="identifier"
mdb_instance="MDB_operating" modification_date="" name="my blue house"   source="CMSDK"
status="Private"/>
            <Workshop.DM:Attributes.Specific state="inhabited" num_windows="6" num_pieces="12" />
            <Workshop.DM:Links>
                <Workshop.DM:Link comments="description of the link" date="" id_FO_1="identifier IPT
830"   id_FO_2="identifier   Datum   835"   mdb_instance="MDB_operating "   owner="to39751"
subtype="link                 subtype"                 type="HISTORY"
xmlns:Workshop.DM="http://www.company.com/egat/Workshop/DM" />
                <Workshop.DM:Link comments"=description of the link" date="" id_FO_1 ="identifier IPT
830"   id_FO_2="identifier   Datum   835"   mdb_instance="MDB_operating"   owner="to39751"
subtype="link                 subtype"                 type="HISTORY"
xmlns:Workshop.DM="http://www.company.com/egat/Workshop/DM /">
                <Workshop.DM:Link comments="description of the link" date=""" id_FO_1="identifier IPT
830"       id_FO_2="identifier         Datum         835"         mdb_instance="MDB_operating"
        owner="to39751"
subtype="link                 subtype"                 type="HISTORY"
xmlns:Workshop.DM="http://www.company.com/egat/Workshop/DM" />
            </Workshop.DM:Links>
        </Workshop.DM:FrameworkMetaData>
    </Workshop.DM:ObjectProxy>
        </Workshop.DM:EEObjectProxy>
```

The invention claimed is:

1. A method of data management in a collaborative service-oriented workspace, employed in an information technology system, the method comprising:

accessing at least one datum representative of a physical object, which is stored in a first memory in a remote device;

extracting at least one characteristic information item of the at least one datum according to a predetermined parameter;

storing, in a second memory in a centralized database, the extracted at least one characteristic information item and a link to the at least one datum in a first data object associated with the at least one datum, the first data object being stored in the second memory in the centralized database;

selecting at least one data object representative of a process;

determining, in the at least one data object representative of the process, a link to the first data object associated with the at least one datum employed by the process and representative of a physical object; and executing the process, wherein the first data object is associated with generic metadata that is common to all data objects in the collaborative service-oriented workspace and specific metadata that defines at least one attribute of the physical object represented by the at least one datum.

2. A method according to claim 1, further comprising receiving at least one complementary information item, the complementary information item being stored in the second memory in the first data object associated with the at least one datum.

3. A method according to claim 1, wherein the at least one characteristic information item comprises at least one attribute common to a plurality of data and at least one attribute specific to the at least one datum.

4. A method according to claim 1, wherein the first data object comprises a link to a second data object, separate from the first data object.

5. A method according to claim 4, further comprising determining consistency of the first data object according to the link to the second data object.

6. A method according to claim 4, wherein one of the first and second data objects is associated with data representative of physical objects and the other of the first and second data objects is associated with data representative of processes.

7. A method according to claim 1, further comprising:
storing in the second memory, in the first data object representative of the physical object employed by the process, a link to the at least one data object representative of the process; and
storing in the second memory, in the at least one data object associated with data representative of the process, a link to the first data object associated with data representative of the physical object employed by the process.

8. A method according to claim 7, further comprising:
creating data representative of a physical object;
creating a second data object associated with the created data;
storing in the second memory, in the created second data object, a link to the at least one data object representative of the process; and
storing in the second memory, in the object representative of the process, a link to the created second data object.

9. A method according to claim 1, wherein the first data object is stored in the second memory in a form of at least one table or at least one XML file.

10. The method of claim 1, further comprising:
forming the first data object, the first data object being formed based on information items contained within a metadata set including the at least one characteristic information item of the at least one datum.

11. The method of claim 10, wherein the metadata set includes one or more generic information items common to all data, one or more specific information items specific to the at least one datum, and one or more links to other data objects.

12. A non-transitory computer readable medium including computer executable instructions which, when executed by a computer, causes the computer to perform a method of data management in a collaborative service-oriented workspace, employed in an information technology system, the method comprising:
accessing at least one datum representative of a physical object, which is stored in a first memory in a remote device;
extracting at least one characteristic information item of the at least one datum according to a predetermined parameter;
storing, in a second memory in a centralized database, the extracted at least one characteristic information item and a link to the at least one datum in a first data object associated with the at least one datum, the first data object being stored in the second memory in the centralized database;
selecting at least one data object representative of a process;
determining, in the at least one data object representative of the process, a link to the first data object associated with the at least one datum employed by the process and representative of a physical object; and
executing the process, wherein
the first data object is associated with generic metadata that is common to all data objects in the collaborative service-oriented workspace and specific metadata that defines at least one attribute of the physical object represented by the at least one datum.

* * * * *